Figure 1:
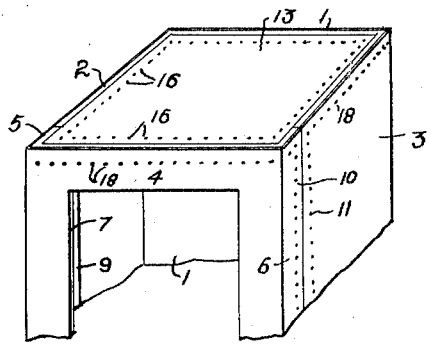

Dec. 27, 1927.

G. R. MEYERCORD 1,654,138

SEALED JOINT BETWEEN END AND SIDE WALLS OF STRUCTURES

Filed Oct. 15, 1923

INVENTOR:
George R. Meyercord,
BY
Wm F. Freudenreich,
ATTORNEY

Patented Dec. 27, 1927.

1,654,138

UNITED STATES PATENT OFFICE.

GEORGE R. MEYERCORD, OF CHICAGO, ILLINOIS, ASSIGNOR TO HASKELITE MANUFACTURING CORPORATION, A CORPORATION OF NEW YORK.

SEALED JOINT BETWEEN END AND SIDE WALLS OF STRUCTURES.

Application filed October 15, 1923. Serial No. 668,504.

One of the great problems of the householder is to avoid damage to or even destruction of garments, furs, rugs, and other things by moth larvæ and other insect life, and it has become an almost universal custom to place expensive furs in cold storage during the seasons when they are not in use. Other clothing that is not to be used at the time, if not placed in cold storage, must be constantly watched, as must rugs and other things that form food for insects, in order to prevent them from being damaged; this necessity for constantly watching one's goods causing inconvenience and annoyance, even if one happens to be methodical enough not to forget to keep watch.

It has long been known that insect life, even in the egg stage, may be destroyed by maintaining an atmosphere composed of the vapors of any one of several so-called fumigants, and entire rooms have been treated with these fumigants for the purpose of destroying insect life in and on the rugs, furniture and other things forming the furnishings of such rooms, and especially built rooms or chambers have been provided for treating goods of various kinds on a large scale.

If a householder attempts to destroy the insects by fumigating the house, the latter must either be abandoned as a habitation for many hours, or the work must be done one room at a time. In either event, the process interferes with the normal use of the house and, since most of the effective fumigating materials have disagreeable odors, it is not pleasant for the householder to go through either of these processes of protecting his goods, and it is therefore very seldom done.

The most satisfactory way of treating or processing things to cleanse them of insect life would be to place them in airtight cupboards or portable vaults and there surround them with a life-destroying atmosphere. However, so far as I am aware, it has heretofore been impossible to make a substantially airtight cupboard or the like except at an expense so great as to preclude the use of the same as an ordinary piece of furniture to be commonly used for freeing clothing, rugs or other goods susceptible to the attack of insects, from such insects. The principal difficulty heretofore encountered has been in making airtight joints between materials of such a nature and secured together in such a way that the cost of manufacture shall be moderate, because the most carefully made joints, unless between metal parts brazed or welded together, have not been airtight.

The main object of the present invention is to produce a simple and novel joint which will make it possible, at a very low cost, to obtain an airtight joint between individual walls of comparatively light and cheap material as, for example, between the end and the side walls of a cupboard or other device.

Figure 2:
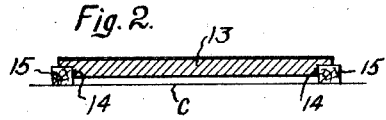
Figure 3:
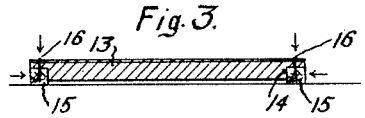
Figure 4:
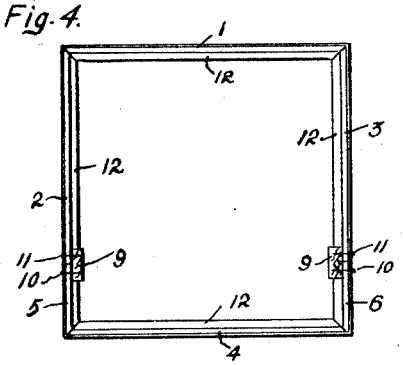
Figure 5:
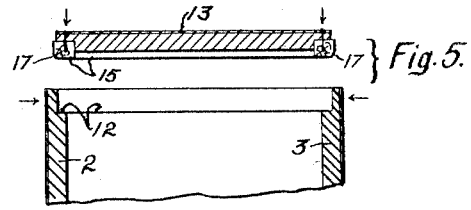
Figure 6:
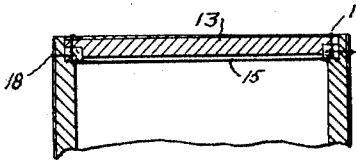
Figure 7:
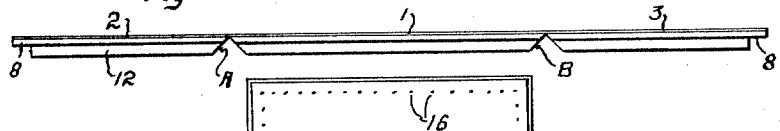
Figure 8:
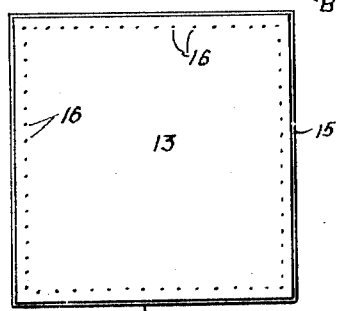

The various features of novelty whereby my invention is characterized will hereinafter be pointed out with particularity in the claims; but for a full understanding of my invention and of its objects and advantages, reference may be had to the following detailed description taken in connection with the accompanying drawing, wherein:

Figure 1 is a perspective view of the upper portion of a cupboard made in accordance with my invention, the door being omitted; Fig. 2 is a vertical section through the top of the structure laid upon the sealing strips, preparatory to attaching such strips thereto; Fig. 3 is a view similar to Fig. 2 showing the condition of the parts at the time of the fastening of the sealing strips to the top; Fig. 4 is a top plan view of the body portion of the structure before the top is placed in position thereon; Fig. 5 is a vertical section through the top and the upper portion of the body member of the structure, illustrating the act of placing the top in position; Fig. 6 is a vertical section through the upper portion of the completed cupboard; Fig. 7 is an edge view of the panel for forming one side and portions of two of the other sides of the cupboard; and Fig. 8 is a top plan view of the top member ready to be connected to the body of the cupboard.

While my invention may take various other forms and be used for other purposes than cupboards, I have illustrated only a single form as applied to a cupboard and, for the sake of brevity, shall confine the detailed description to this particular form and use.

The structure shown in the drawing is shown as being square in transverse section and of any desired height; the front wall having a door opening to which a door may be applied. The material out of which the device is made is preferably plymetal, which takes the form of panels composed of a thick body member of wood or wood pulp, which is compressible and more or less elastic, sheathed on the outer face with metal which is cemented thereto. The four side walls are conveniently made of two panels each grooved lengthwise along two parallel lines, on the inner sides, for a depth equal to the thickness of the wood or wood pulp, so that when the panels are bent along the lines of the grooves, each will comprise three sections two of which are arranged parallel with each other and at right angles to the third section, the metal sheathing being continuous past the corners between the sections. One of these panels is shown in Fig. 7, there being two V-shaped grooves A and B that divide the panel into a central section 1 and two side sections 2 and 3. When the sections 2 and 3 are folded downwardly, as viewed in Fig. 4, they take up positions at right angles to the central section so as to form the rear wall and parts 2 and 3 of two adjacent side walls of the cupboard, as shown in Fig. 1. The other panel comprises a central section 4 and two side sections 5 and 6; the section 4 forming the front wall of the cupboard and the sections 5 and 6 cooperating respectively with the sections 2 and 3 to complete the two side walls. The front wall has a door opening 7. In order to permit the meeting edges of the two panels to be securely fastened together so as to make an airtight joint, I cut away a portion of each panel on the inner side along the vertical edges, to produce portions 8 of reduced thickness. When the meeting edges of the panel are brought together, each meeting pair of thin marginal portions 8 will form the bottom of a comparatively wide groove extending throughout the length of the panels. Into each of these grooves there is pressed tightly a strip of wood 9 held in place by means of nails arranged closely together in two rows 10 and 11 lying on opposite sides of the plane of contact between the corresponding edges of the panels. The ends of the panels, only one of which is shown, are reduced in thickness, preferably for a distance somewhat greater than the thickness of the material out of which the panels, including the top section, are made, by cutting away a marginal portion on the inner side so as to form a continuous shoulder 12 facing upwardly or downwardly, as the case may be. The top and bottom end members, only one of which is shown, but which may be duplicates of each other, are provided with marginal portions reduced in thickness by cutting away the wood or wood pulp and producing a continuous shoulder around each of the same and facing toward the edges; the top or other end member being indicated at 13 and the shoulder on the inner side of the same at 14.

The end member is made of the proper size to fit into the end of the body member of the structure beyond the shoulder 12 in the latter. It will be seen that the shoulders 14, together with the inner faces of the reduced marginal portions of the end member and side walls will form a continuous square or rectangular passage extending around the inside of the structure if the outer surface of the end member is located flush with the plane of the extreme outer edge of the body member. In this rectangular passage I place a strip of compressible, more or less elastic material, through which air will not pass; the compressibility and the elasticity of the strip insuring an airtight contact between the same and the engaging faces of the sides and end of the structure if it is held in place under compression. The material I prefer to use for the strips is wood, they being made of the proper lengths to fit into the spaces provided for them and somewhat larger in transverse dimensions than the corresponding dimensions of such spaces. The strips are preferably attached first to the end member. In doing this, I place the strips 15 in the form of a frame upon which the end member is set, as shown in Fig. 2, the reduced marginal portions of the end member resting on the strips and the continuous shoulder 14 engaging with the inner sides or faces of the strips. Assuming that the line C represents the top of a flat table or the like, pressure is exerted on the end member 13 and the strips in the directions of the arrows in Fig. 3, the pressure being great enough to produce an actual compression of the strips or of the wood or pulp board of the end member, or both. While this pressure is being maintained, the end member is nailed to the strips by means of nails 16; these nails extending in a continuous line across the end member near each edge thereof, best shown in Fig. 1. After the pressure is removed, the strips may bulge outwardly more or less, as indicated in Figs. 5 and 8. In this event, if the end is to be applied to a completed body member, I chamfer the strips along the lower outer corners as indicated at 17 in Fig. 5, so as to permit the strips to be started into the space within the end of the body structure. Pressure is applied in the direction of the arrows in Fig. 5, not only a downward pressure on the end member, but also an inward pressure on the reduced marginal portions of the body, so that the strips will be compacted, as shown in Fig. 6, in which condition they are united to the side walls of the body member by means of nails 18 arranged close together in rows, as best shown in Fig. 1.

Instead of forcing the end member into the end of a completed body member, the panels of which the body member is made can be folded around the two end members, suitable apparatus being provided to exert the necessary pressure at the desired points. Thus it will be seen that if an end member is placed in the same relative position to one of the panels, as Fig. 8 is related to Fig. 7, the central section of the panel may be engaged with one edge of the end member, and the two side sections may be folded downwardly and inwardly into contact with two other edges of the end member. While the parts are in these positions, the nails may be applied to fasten the side wall sections of the structure to the end member or section.

It will thus be seen that I have provided a cheap, light and simple box-like structure in which the joints will be airtight so that after the same has been closed by a suitable sealed door, it may be used successfully to effect the extermination of all insect life that may be preesnt within the same.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. The method of forming a sealed joint between an end member and the side walls of a vault which consists in so shaping an end member and side walls that the end member will fit into the space between said walls and overlie a shoulder extending along the latter adjacent to the marginal portion of said end member and the end member will have a shoulder facing outwardly on the inner side thereof and extending around the said member at some distance from the edges thereof, compressing an elastic strip into the angle between the shoulder and the inner marginal surface on said member in a direction parallel to the plane of said member to a degree within the elastic limit of said strip, securing said strip to said member while in a compressed condition, assembling said member and said walls and further compressing said strip into the angle between the shoulder and the marginal portions on said walls to a degree within the elastic limit of said strip, and securing said marginal portions of the walls to said strip while the latter remains under compression.

2. The method of forming a sealed joint between an end member and the side walls of a structure which consists in so shaping an end member and side walls made of a compressible material sheathed on the outer face with metal cemented thereto that the end member will fit into the space between said walls and overlie a shoulder extending along the latter adjacent to the marginal portions of said end member and the end member will have a shoulder facing outwardly on the inner side thereof and extending around the said member at some distance from the edges thereof, pressing an elastic strip into the angle between the shoulder and the inner marginal surface on said member and compressing it in a direction parallel with the plane of said member to a point within its elastic limit securing said strip to said member while in a compressed condition, assembling said member and said walls and further compressing said strip into the angle between the shoulder and the marginal portions on said walls to a degree within the elastic limit of said strip, and securing said marginal portions of the walls to said strip while the latter remains under compression.

3. The method of forming a sealed joint between an end member and the side walls of a structure which consists in so shaping an end member and side walls made of a compressible material sheathed on the outer face with metal cemented thereto that the end member will fit into the space between said walls and overlie a shoulder extending along the latter adjacent to the marginal portion of said end member and the end member will have a shoulder facing outwardly on the inner side thereof and extending around the said member at some distance from the edges thereof, compressing an elastic strip into the angle between the shoulder and the inner marginal surface on said member to a degree within the elastic limit of said strip and nailing said strip to said member while in a compressed condition, assembling said member and said walls and further compressing said strip into the angle between the shoulder and the marginal portions on said walls, and nailing said marginal portions of the walls to said strip while the latter remains under compression.

4. A structure having side walls reduced in thickness adjacent to one end to produce a continuous outwardly-facing shoulder around the interior thereof, an end member fitting into the space within said walls outwardly from the aforesaid shoulder, said end member being reduced in thickness adjacent to the edges to form a continuous outwardly-facing shoulder lying inwardly from the edges of said members, a compressed strip of more or less elastic material lying in contact with the said shoulders and the portions of reduced thickness of said walls and said end member, fastening means passing through the portions of reduced thickness of said member into said strip, and fastening means passing into said strip through the portions of reduced thickness of said walls.

5. A structure made of an end member and side walls each composed of a compressible, more or less elastic material sheathed on the outer faces with metal cemented thereto, the metal sheathing being continuous around the corners between the side walls, said side walls being reduced in thickness adjacent to one end to produce a continuous outwardly-facing shoulder around the interior thereof, an end member fitting into the space within said walls outwardly from the aforesaid shoulder, said end member being reduced in thickness adjacent to the edges to form a continuous outwardly-facing shoulder lying inwardly from the edges of said member, a compressed strip of more or less elastic material lying in contact with the said shoulders and the portions of reduced thickness of said walls and said end member, fastening means passing through the portions of reduced thickness of said member into said strip, and fastening means passing into said strip through the portions of reduced thickness of said walls.

6. A structure having side walls composed of a compressible material possessing more or less elasticity reduced in thickness adjacent to one end to produce a continuous outwardly-facing shoulder around the interior thereof, an end member composed of a compressible material possessing more or less elasticity fitting into the space within said walls outwardly from the aforesaid shoulder, said end member being reduced in thickness adjacent to the edges to form a continuous outwardly-facing shoulder lying inwardly from the edges of said member, a compressed strip of more or less elastic material lying in contact with the said shoulders and the portions of reduced thickness of said walls and said end member, fastening means passing through the portions of reduced thickness of said member into said strip, and fastening means passing into said strip through the portions of reduced thickness of said walls.

In testimony whereof, I sign this specification.

GEORGE R. MEYERCORD.